(No Model.)
F. DOUGLAS
BICYCLE.
No. 469,339. Patented Feb. 23, 1892.
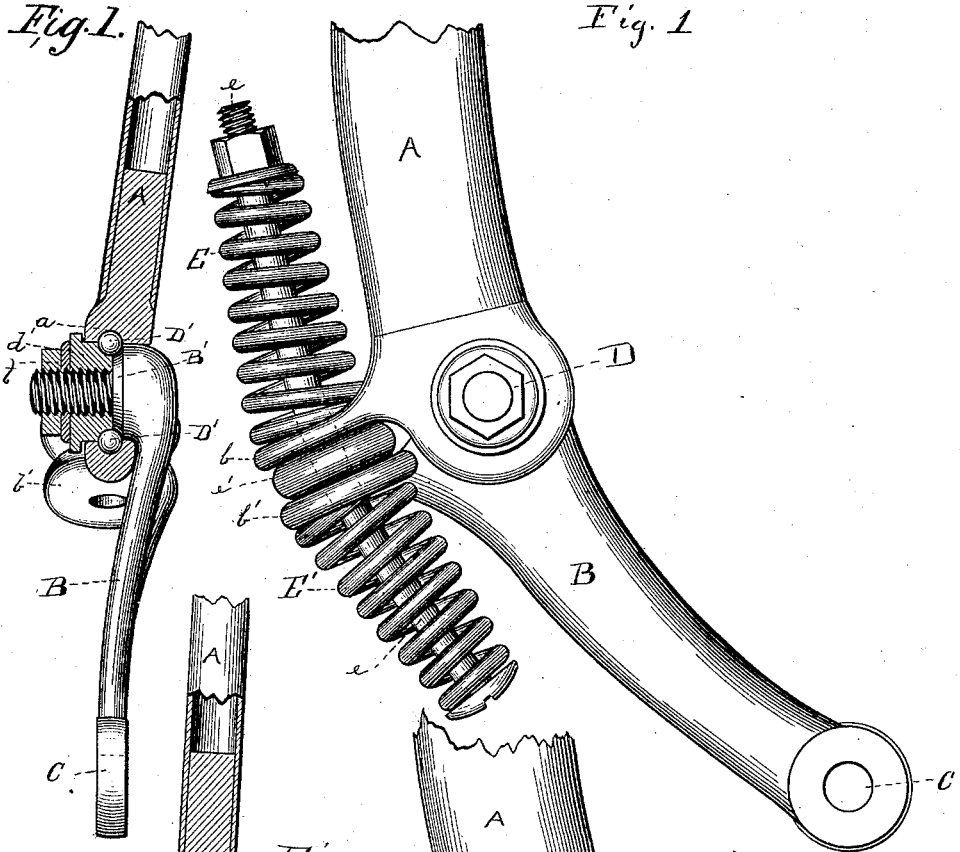
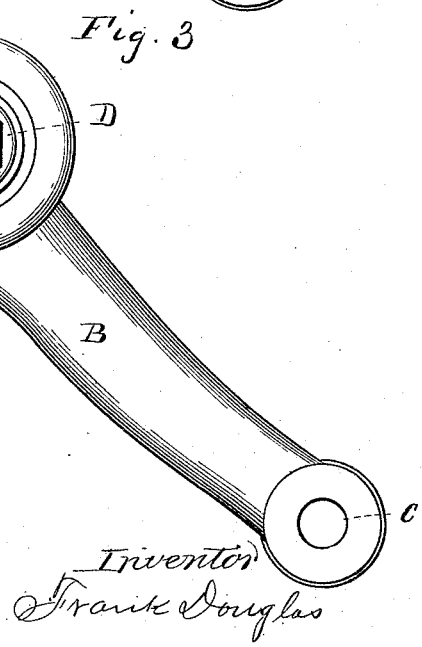
Witnesses
W. Rositer
F. L. Douglas
Inventor
Frank Douglas

UNITED STATES PATENT OFFICE.

FRANK DOUGLAS, OF CHICAGO, ILLINOIS.

BICYCLE.

SPECIFICATION forming part of Letters Patent No. 469,339, dated February 23, 1892.

Application filed May 12, 1890. Serial No. 351,573. (No model.)

*To all whom it may concern:*

Be it known that I, FRANK DOUGLAS, of the city of Chicago and county of Cook, in the State of Illinois, have invented certain new and useful Improvements in Velocipedes, of which the following is a specification.

My improvements relate more particularly to the forks or portions of the frames of velocipedes which span and hold bearings for wheels and are connected with non-rotating axles and are provided with a spring, such as the rear wheels of bicycles and the steering-wheels of tricycles or bicycles, and I shall describe them as applied in the form which I prefer to the steering-wheel of a bicycle, though they will be obviously applicable with equal advantage elsewhere. Heretofore such forks have been constructed with a single non-adjustable coiled spring and provided with plain or taper joint-bolts, and sometimes with long curved springs and complicated and heavy rods, all connecting the front-wheel axle with the head, and sometimes the spring motion is obtained by hanging the axle on a spring without provision for preventing the lateral movement of the wheel. In all these forms of construction, however, there are certain disadvantages which it is desirable to overcome. In the single-coil-spring form as heretofore made no means have been provided to adjust the tension to suit the weight of the rider, and in the taper-bolt joint which is commonly employed with this form of spring a bolt, either tapered or straight, is used to form the joint, which, if sufficiently tight to prevent lateral motion of the wheel, is liable to create friction and cut in its bearing. In the long curved-spring arrangement the springs present an unsightly appearance and the necessity of heavy and expensive construction of rods and joints for preventing lateral motion of the wheel. In the arrangement in which the wheel is simply hung on springs the lateral movement cannot be prevented and the bicycle-wheel is therefore unstable and impracticable.

It is the object of my improvement to construct a spring-fork which shall combine an easy flexible movement with lightness, grace, and lateral rigidity, and to so construct the joint-bearing as to secure the greatest possible freedom from friction and practically prevent motion in any other direction than that in which it is intended to operate; and my improvements consist in the jointed fork provided with ball-bearings and a spring or springs capable of adjustment to suit the requirements of the rider.

In the accompanying drawings, Figures 1 and 3 show forms of my improvement in elevation, and Figs. 2 and 4 sectional views of my improved ball-bearings.

A is the lower end of the fork.

B is an extension-arm connecting the fork A with the axle of the wheel.

C is the lower end of the extension-arm at the point where the wheel-axle is attached.

E and E' are spiral springs resting upon the ears $b$ and $b'$ and held in place by the bolt $e$.

Similar letters refer to similar parts throughout the various views.

The springs E E' are connected together and held in their places on the spring-ears $b$ and $b'$ by means of the bolt $e$, which passes freely through said springs and through suitable holes provided in the spring-ears. This bolt $e$ is provided with a thread and nut at one or both of its ends, whereby the tension of the springs may be adjusted. Between the spring-ears is a buffer $e'$, of rubber or other flexible material, to prevent a jar when the springs operate to bring the extension B back to its normal position.

The fork A, Fig. 2, has a grooved recess $a$ to receive the balls D' for their outer bearing in the fork. Extension-arm B has a grooved surface B' turned upon its right-angle projection, which serves as an inner bearing for the balls D' D'. The threaded portion of this projection receives the hardened-steel follower-bearing $d'$, which is grooved to form an under bearing for the balls at its inner end and is provided with a knurled flange at its outer end, whereby it may be screwed up to the balls, thus completing the bearing. This follower $d'$ is held in its proper adjustment by check-nut $f$, which serves as a jam-nut.

Fig. 4 is a modification of Fig. 2, in which the outer bearing of the balls D' D' are turned in a hardened-steel ring $d$, which is firmly screwed or otherwise fastened in the fork A. The hardened-steel ring $d^2$ is grooved on one side to form an under bearing for balls D' D' and is turned on its inner side to fit firmly on the right-angle projection of extension-arm B. The follower d' and check-nut f are the same as shown in Fig. 2.

Having thus described my invention, what I claim as new, and desire to secure by Letters Patent, is—

The spiral springs E E', in combination with ears b b', bolt e, and joint of a bicycle-fork, substantially as described.

FRANK DOUGLAS.

Witnesses:
H. E. SCHUNTZ,
M. A. OSTRUM.